May 23, 1961 R. W. JOHNSTON 2,984,909
DENTAL APPARATUS
Filed Aug. 4, 1958
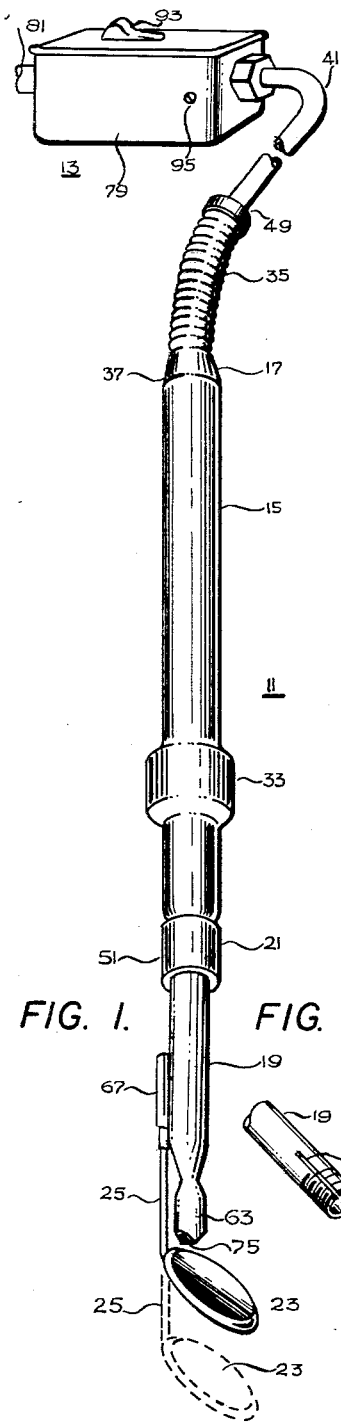
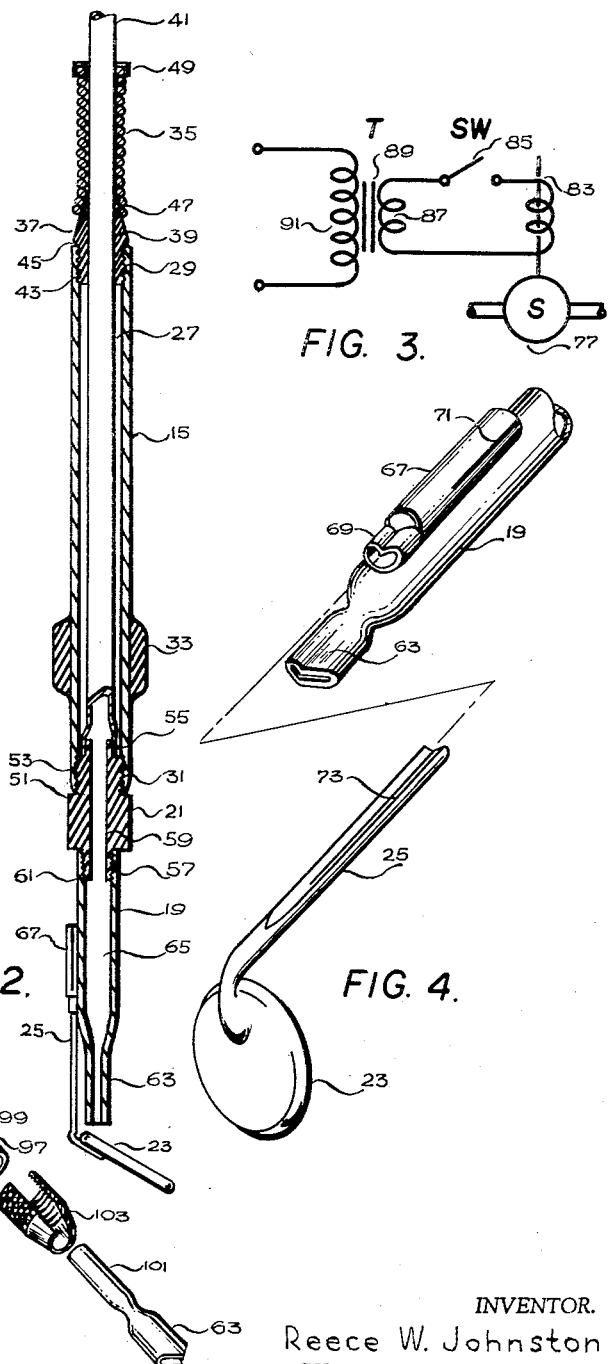
INVENTOR.
Reece W. Johnston
BY United States Patent Office 2,984,909
Patented May 23, 1961

2,984,909
DENTAL APPARATUS
Reece W. Johnston, 3040 Glen Garden Drive N., Fort Worth, Tex.
Filed Aug. 4, 1958, Ser. No. 752,829
3 Claims. (Cl. 32—69)

My invention relates to dental apparatus and more particularly to dental air mirrors.

The general object of my invention is to provide an improved dental air mirror.

Another object of my invention is to provide a dental air mirror having a readily controllable air supply.

Another object of my invention is to provide a dental air mirror which is easy to manipulate and handle.

Another object of my invention is to provide a dental air mirror incorporating an improved structural arrangement.

These and other objects are effected by my invention as will be apparent from the following description, taken in accordance with the accompanying drawings, forming a part of this application, in which:

Fig. 1 is a schematic perspective view showing the dental air mirror and control apparatus in accordance with a preferred embodiment of my invention;

Fig. 2 is a longitudinal section view of the dental air mirror of Fig. 1;

Fig. 3 is a schematic circuit diagram;

Fig. 4 is an enlarged schematic perspective view showing details of the end portion of the dental air mirror and the mirror per se; and Fig. 5 is a fargmentary schematic perspective view showing an alternative arrangement for the end portion of the device.

Referring now to the drawings there is shown an air mirror assembly 11 and an air supply control assembly 13. The air mirror assembly 11 includes a body portion 15, an air conduit guide and retainer portion 17, a front end member 19, an intermediate coupling member 21, a mirror 23 and a mirror stem 25. The body portion is in the form of a cylinder having a central bore 27 and provided with internal threads 29, 31 at each end. A cylindrical sleeve 33 having tapered ends and having inside diameter equal to the body portion outside diameter is fixed on the body portion 15 near the body front end. The air mirror assembly 11 is hung on a rack (not shown) when not in use, and the sleeve 33 serves as a stop which engages the rack and prevents the assembly from falling through the rack opening. The air conduit guide and retainer portion 17 of the air mirror assembly comprises a coil spring 35 and a fitting 37. The fitting 37 has an internal bore 39 sized to receive the air conduit line 41, and has external threads 43 at its front end mating with the internal threads 29 at the rear end of the body 15, with a shoulder 45 at the base of the threads 93 which abuts the body rear end when the fitting 37 is in assembled position. The fitting 37 tapers from the shoulder 45, where it is substantially the same diameter as the body 15, inwardly and rearwardly to external threads 47 at its rear end portion. The coil spring 35 is adapted for screwing onto the fitting rear end threads. The internal diameter of the coil spring at rest is just less than the external diameter of the air conduit line 41, so that the air conduit line will be held snugly when passed through the spring bore. The spring is provided with an end cap 49 at its rear end. The intermediate coupling member 21 is a fitting having an intermediate cylindrical portion 51 with outside diameter substantially equal to that of the body 15, external threads 53 at its rear end adapted to be received by the internal threads 31 at the front end of the body 15, a cylindrical portion 55 of reduced diameter extending rearwardly from said threads and adapted for receiving one end of the air conduit line 41, external threads 57 at its front end, and an axial bore 59. The front end member 19 is cylindrical over most of its length, and is provided with internal threads 61 at its rear end which are adapted to be received by the threads 57 at the front end of the coupling member 21. The front end portion of the front end member 19 tapers forwardly and inwardly to merge with a duck bill 63 formed at its outer end. The front end member 19 is provided with a central bore 65 which merges with the duck bill interior.

The front end member has a mirror stem holder fixed to its outer surface and extending longitudinally thereof. The stem holder is a hollow thin-walled cylinder having a front end portion which has been cut and crimped to form a short conduit 69 of heart-shaped transverse section, and a rear end portion having a deep diametral slit 71. The mirror stem 25 is a rod having a longitudinal groove 73 extending from its outer end over most of its length and of tapered depth decreasing in the direction away from the outer end. The stem 25 is received by the stem holder 67 which acts to hold it firmly at any longitudinal position. The mirror 23 is fixed to the outer end of the stem 25 at a suitable angle relative to the stem. The mirror 23 is longitudinally adjustable relative to the duck bill opening 75, or air exit, and the mirror is held so that it is bisected by a plane which bisects the duck bill through its narrow dimension.

The air supply control assembly 13 includes a solenoid valve 77 contained in a suitable housing 79. An air supply conduit 81 from a source (not shown) is connected to one side of the valve 77, and a second air supply conduit 41 is connected from the other side of the valve 77 to the air mirror assembly 11. The electrical circuit for the air supply control assembly is shown by Fig. 3, wherein the solenoid coil 83 is connected in series with a control switch 85 across the secondary winding 87 of a step-down transformer 89 the primary winding 91 of which is connected to a conventional 110 volt alternating current source (not shown). The transformer 89 and switch 85 are contained within the housing, with the switch operator 93 protruding from a housing wall. The solenoid valve 77 is provided with an adjustable gate which may be adjusted by means of a screw 95 or knob which is accessible at the housing exterior. The housing 79 is mounted at a convenient location on the dental chair accessory apparatus (not shown). The step-down transformer 89 may be eliminated if a 110 volt solenoid is used. The air supply conduit 41 which connects to the air mirror assembly 11 is preferably a flexible rubber or plastic hose.

In some cases, for manufacturing convenience, it may be desirable to make the duck bill portion of the front end member as a separate part (see Fig. 5). In this case, the front end member 19 is made to have external threads 97 at its outer end, and also is provided with a longitudinal slit 99 at the threaded end portion. The duck bill portion is provided with a cylindrical shank 101 which fits inside the threaded end of the front end member 19. An internally threaded coupling sleeve 103 is threaded onto the front end member, causing the slit 99 to partially close, thus securely clamping the duck bill shank 101.

While I have shown my invention in only one form, it will be obvious to those skilled in the art that it is not so limited, but is susceptible of various changes and modifications without departing from the spirit thereof.

I claim:

1. A dental air mirror assembly comprising a tubular body portion internally threaded at one end, a tubular front end portion internally threaded at its inner end and terminating in a duck bill at its outer end, an intermediate coupler fitting having external threads at each end and having a central bore, the threads at one end being threaded onto the internal threads of said body portion and the threads at the other end being threaded onto the internal threads of said front end portion, a shoulder extending outwardly beyond the threads of said intermediate coupler at the end thereof which is threaded onto said body portion for receiving a length of flexible conduit hose, a mirror support stem, a mirror fixed to said stem, and means fixed to said front end portion for securing said stem in longitudinally adjustable relation relative to said duck bill so that an air stream from said duck bill would impinge on said mirror.

2. A dental air mirror assembly comprising a tubular body portion internally threaded at each end, a tubular front end portion internally threaded at its inner end and terminating in a duck bill at its outer end, an intermediate coupler fitting having external threads at each end and having a central bore, the threads at one end being threaded onto said body portion and the threads at the other end being threaded onto said front end portion, an air conduit guide and retainer comprising a coil spring fixed to an end fitting having a central bore and external threads received by the rear end of said body, said air conduit and retainer guide and said body being adapted for receiving a length of flexible air conduit hose, with the end of said hose being received by said intermediate coupler fitting, a mirror support stem, a mirror fixed to said stem, and means fixed to said front end portion for securing said stem in longitudinally adjustable relation relative to said duck bill and so that an air stream from said duck bill would impinge on said mirror.

3. A dental air mirror assembly comprising a tubular body portion internally threaded at each end, a tubular front end portion internally threaded at its rear end and externally threaded at its front end, a duck bill having a tubular shank, sleeve means cooperating with the external threads of said front end portion for removably receiving and securing said shank to said front end portion, an intermediate coupler fitting having external threads at each end and having a central bore, the threads at one end being threaded onto said body portion and the threads at the other end being threaded onto said front end portion, an air conduit guide and retainer comprising a coil spring fixed to an end fitting having a central bore and external threads received by the rear end of said body, said air conduit and retainer guide and said body being adapted for receiving a length of flexible air conduit hose, with the end of said hose being received by said intermediate coupler fitting, a mirror support stem, a mirror fixed to said stem, and means fixed to said front end portion for securing said stem in longitudinally adjustable relation relative to said duck bill and so that an air stream from said duck bill would impinge on said mirror.

References Cited in the file of this patent

UNITED STATES PATENTS 2,779,100     Claessens _____ Jan. 29, 1957

FOREIGN PATENTS 162,055     Sweden _____ Feb. 4, 1958